United States Patent [19]

Simmons

[11] Patent Number: 5,507,360

[45] Date of Patent: Apr. 16, 1996

[54] HYDRAULIC SYSTEM FOR DYNAMIC BRAKING AND SECONDARY STEERING SYSTEM SUPPLY

[75] Inventor: Gerald P. Simmons, Morton, Ill.

[73] Assignee: Caterpillar Inc., Peoria, Ill.

[21] Appl. No.: 327,949

[22] Filed: Oct. 24, 1994

[51] Int. Cl.[6] ................................................ B62D 5/07
[52] U.S. Cl. ............................ 180/133; 180/244; 91/521; 60/484
[58] Field of Search ............................ 180/79, 132, 133, 180/244, 233; 91/519, 521, 522; 60/484; 137/815; 417/286

[56] References Cited

U.S. PATENT DOCUMENTS

| | | | |
|---|---|---|---|
| 2,910,085 | 10/1959 | Banker . | |
| 3,613,818 | 10/1971 | Swayze et al. | 180/133 |
| 3,841,095 | 10/1974 | Baker | 137/101 X |
| 3,851,721 | 12/1974 | Comer, Jr. et al. | 180/133 |
| 3,935,918 | 2/1976 | Hicks et al. | 180/133 |
| 4,075,840 | 2/1979 | Jesswein | 60/422 |
| 4,142,842 | 3/1979 | Hicks et al. | 417/288 |
| 4,174,018 | 11/1979 | Liebert et al. | 180/132 |
| 4,253,382 | 3/1981 | Yip | 91/516 |
| 4,420,934 | 12/1983 | Udono | 137/117 X |
| 4,627,239 | 12/1986 | Nishimune et al. | 60/484 |

Primary Examiner—Margaret A. Focarino
Assistant Examiner—F. Zeender
Attorney, Agent, or Firm—Loyal O. Watts

[57] ABSTRACT

In certain machines, such as construction equipment, it is desirable to provide a supplemental fluid supply for hydraulic steering systems to maintain sufficient fluid flow should a failure occur in the primary fluid supply. It is also desirable to provide retarding or dynamic braking to help control speed of the machine when operating downhill with a heavy load. A ground driven pump is provided to supply fluid to a selector valve for selectively directing the output of the ground driven pump to a steering system or a dynamic braking system. The selector valve is responsive to pressure in the steering system to direct flow from the ground driven pump to the steering system when the pressure drops below a predetermined level. The operator may selectively direct flow from the ground driven pump to the dynamic braking system when dynamic braking is needed. A dynamic braking valve may be operator controlled to regulate the degree of dynamic braking required to maintain the desired machine speed under specific operating conditions. In this manner a supplemental supply is provided which may be selectively directed to the steering system or the dynamic braking system.

7 Claims, 1 Drawing Sheet

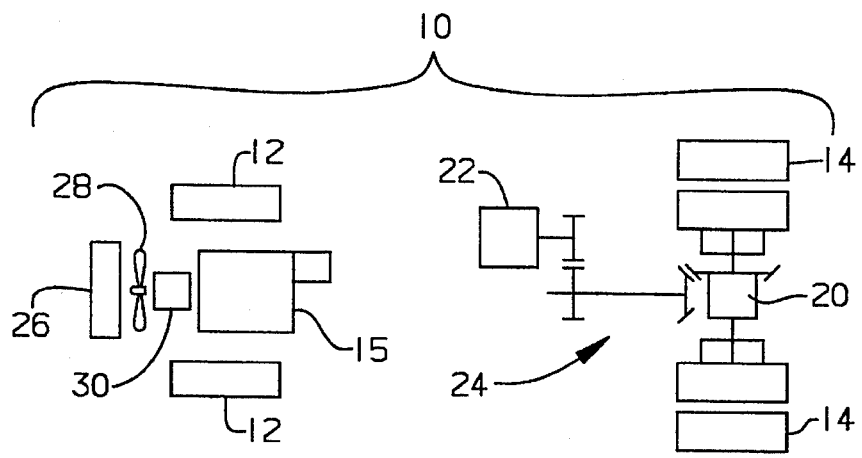
Fig_1_
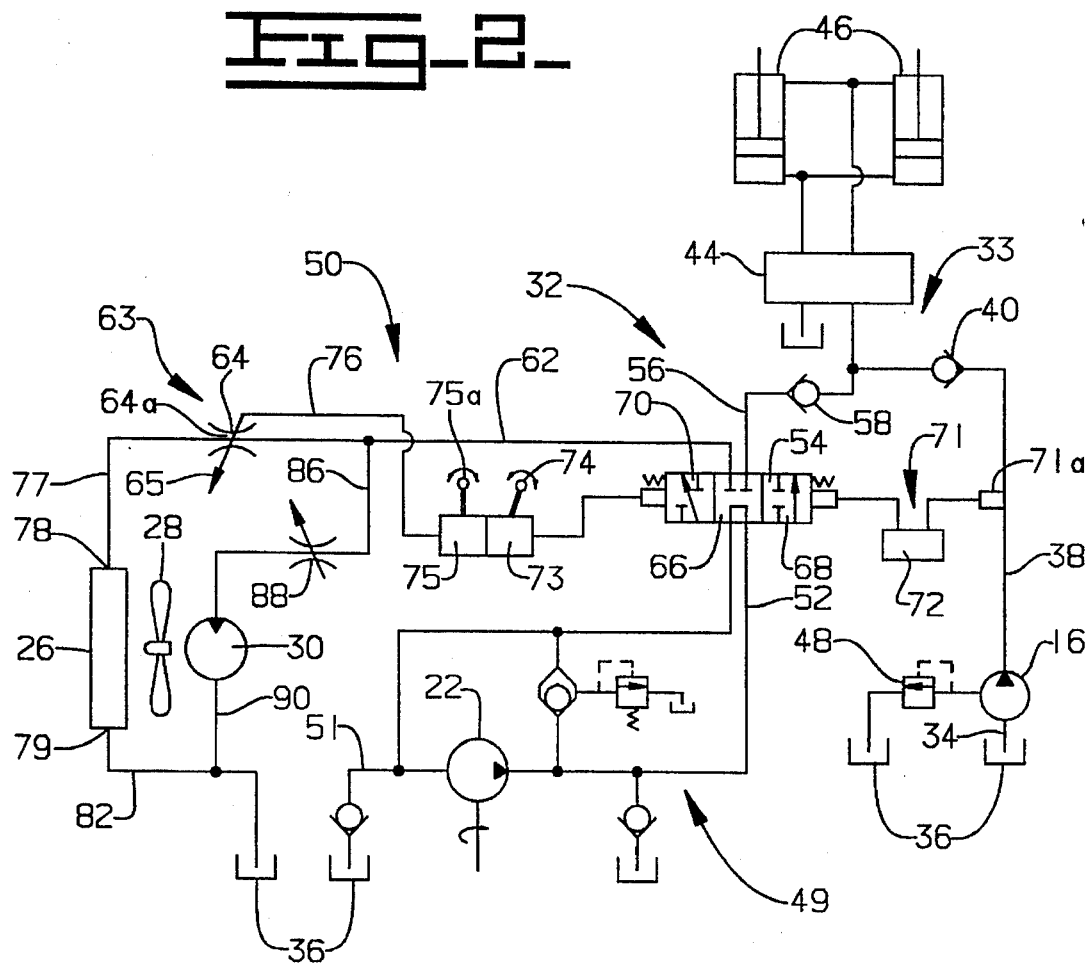
Fig_2_

HYDRAULIC SYSTEM FOR DYNAMIC BRAKING AND SECONDARY STEERING SYSTEM SUPPLY

TECHNICAL FIELD

This invention relates generally to steering and braking systems and more particularly to a secondary supply of fluid to the steering system when there is a failure in the primary system and to provide dynamic braking when needed.

BACKGROUND ART

In machines, such as earth moving equipment having hydraulic steering systems it is desirable that a secondary supply of fluid be provided to permit more complete control of the machine should an interruption occur in the primary supply of hydraulic fluid. The primary supply is normally provided by an engine driven pump of any conventional design.

In currently known machines it is common practice to provide a ground driven pump which supplies hydraulic fluid to the steering system due to an interruption in supply from the primary system due to failure of the engine or the pump itself. Other known systems utilize a separate pump driven by an electric motor to provide a supply of fluid when the primary supply is interrupted. These systems are adequate for supply only to the steering systems and/or the standard brake systems.

In certain types of machines, such as off-highway trucks, it is desirable to provide dynamic braking or retarding to assist in controlling the speed of the machine when operating in downhill conditions. In machines having standard retarding, such as by oil cooled disc brakes, the provision of supplemental dynamic braking can reduce the heat rejection load on the brakes. This allows a reduction in the cooling oil flow required through the oil cooled disc brakes and may also allow a reduction in the size of the oil cooled brakes.

U.S. Pat. Nos. 3,613,818 issued Oct. 19, 1971, 3,851,721 issued Dec. 3, 1974 and 3,935,918 issued Feb. 3, 1976, all commonly assigned to the assignee of the subject invention, teach the provision of a ground driven pump to provide a secondary supply to the steering system or steering and brake systems in the event of failure of the primary fluid supply. None of these systems provide supplemental dynamic braking in combination with the secondary oil supply to the steering system.

Thus, it is desirable to provide a hydraulic system including a ground driven pump to provide a secondary supply of oil which is effective to maintain the operativeness of the steering system and also provide dynamic braking or retarding. Such a system will allow the operator to selectively maintain the desired direction of the machine as well as more complete control of the machine speed.

DISCLOSURE OF THE INVENTION

A hydraulic control system is provided for a wheeled machine having an engine and a drive system for driving at least one wheel of the machine. The hydraulic control system includes a primary fluid work system having a primary pump driven by the engine and a motor communicating therewith, a control valve interposed the primary pump and the motor and a fluid reservoir from which the pump draws fluid. Also included is a secondary fluid supply having a ground driven pump which is adapted to be driven by rotation of the wheel of the machine due to its contact with the ground while the machine is moving.

A dynamic braking system is provided for retarding the speed of the machine during downhill operation.

A selector valve disposed in controlling relation to the output of the ground driven pump has a first position for controllably directing the output of the ground driven pump back to an inlet thereof. A second position of the selector valve directs the output of the ground driven pump to the primary fluid work system and a third position directs the output of the ground driven pump to the dynamic braking system.

A means is provided in the dynamic braking system for controllably, variably restricting the flow of fluid from the ground driven pump to create sufficient pressure in the ground driven pump to retard movement of the machine.

BRIEF DESCRIPTION OF THE DRAWINGS

FIG. 1 is a diagrammatic, plan view of the drive elements of a machine incorporating the present invention; and FIG. 2 is a schematic of a hydraulic control system for the machine of FIG. 1 and incorporating the present invention.

BEST MODE FOR CARRYING OUT THE INVENTION

Referring to FIG. 1 a machine drive train 10 is diagrammatically shown and includes a pair of laterally spaced front wheels 12 and a pair of laterally spaced, dual rear wheels 14. In this particular embodiment, each of the set of the dual wheels are equipped with oil cooled disc brakes which, in some instances, are used for retarding purposes in a conventional manner. This machine could be, for example, an off-highway truck having a load carrying dump body (not shown) of an otherwise conventional design and in which the front wheels 12 are hydraulically steerable relative to a machine frame (not shown). The drive train also includes an engine 15 having a primary hydraulic pump 16 driven thereby and is drivingly connected to the rear wheels through a transmission and drive shaft (not shown) and a differential 20 of suitable conventional design. A pump 22 is connected in driven relation to the dual wheels through the differential 20 by a pair of meshing gears 24 so that the pump is ground driven due to movement of the machine. A fluid cooler 26 is located in cooling relation to a cooling fan 28 driven by a hydraulic motor 30 for purposes to be later explained.

Referring now to FIG. 2, a hydraulic control system 32 is diagrammatically shown and includes a primary fluid work system 33, in this embodiment a hydraulic steering system, which is normally supplied by the primary engine driven pump 16. The primary pump 16 has an inlet line 34 communicating with a reservoir 36 and an outlet line 38 communicating through a one-way check valve 40 to a steering valve 44 which controls flow direction and quantity to a pair of steering jacks or motors 46 in a conventional manner. A relief valve 48 of conventional design limits the pressure in the steering system to a desired maximum value. The steering jacks 46 may be actuated by movement of the steering valve 44 to either of two operative positions, in a conventional manner, to steer the front wheels for controlling the direction of travel of the machine.

The hydraulic control system also includes a secondary fluid supply 49 and a dynamic braking system 50. The secondary supply includes the ground driven pump 22 which has an inlet line 51 connected to the reservoir 36 and an outlet line 52 communicating with a dynamic brake and supplemental steering selector valve 54. The selector valve 54 is connected through a supplemental steer line 56 and a one-way check valve 58 to the primary pump output line 38 intermediate the check valve 40 and the steering valve 44 for secondary or supplemental supply to the steering system. The selector valve 54 is also connected by a supply line 62 to a controllably, variably restricting means 63 including a dynamic braking valve 64 having a flow path 64*a* and a movable control element 65 which may be controlled by an operator to restrict the output flow of the ground driven pump.

The selector valve 54 has a first or neutral position 66 in which the output of the ground driven pump 22 is returned to the inlet line 50 of the pump. A second or steering position 68 of the selector valve 54 connects the output of the ground driven pump 22 to the steering valve supply line 38. A third or dynamic braking position 70 connects the ground driven pump 22 to the dynamic braking valve 64.

A supplemental supply control means 71 includes a pressure sensor 71a for measuring the level of pressure on the outlet side of the pump 16. Also included is a control system 72 which is connected to receive a signal from the pressure sensor and is also connected to the appropriate end of the selector valve 54.

An operator selector control 73, which in this embodiment is operator controlled with a lever 74, is electrically connected to the appropriate end of the selector valve 54 for actuating the selector valve to the third or dynamic braking position 70. An operator dynamic braking control means 75 includes a second control lever 75a, actuation of which directs a signal to the dynamic braking valve 64 through a suitable connector, such as an electrical line 76.

The output side of the dynamic braking valve 64 is connected through a line 77 to an input side 78 of the fluid cooler 26 which has an output side 79 connected to the reservoir 36 by a line 82. A branch line 86 is connected from the supply line 62 to the fluid fan drive motor 30 for driving the fan 28 to induce air flow through the fluid cooler 26. A conventional, thermostatically controlled fan regulating valve 88 is disposed in the branch line 86 for controlling speed of the motor 30 dependent on the temperature of the fluid entering the cooler. The motor 30 is connected to the reservoir 36 by a return line 90 and the line 82.

INDUSTRIAL APPLICABILITY

In operation the primary engine driven pump 16 supplies fluid to the steering directional valve 44 to permit steering of the machine as it traverses the terrain on which it is operating. During this time of normal operation the ground driven pump output is directed back to the inlet line due to the selector valve 54 being in the first or neutral position 66 as shown.

When the machine encounters a downhill area the speed of the machine will increase unless the operator activates some control to retard the speed of the machine. The machine operator may move the control lever 75a of the operator dynamic braking control means 75 the desired amount to actuate the dynamic braking valve 64 to the appropriate position for the degree of dynamic braking needed as determined by the degree of the slope and the load in the machine. Movement of the operator selector control lever 74 to an appropriate position actuates the selector valve 54 to its third position 70 to communicate the output of the pump 22 to the dynamic braking valve 64. Depending upon the degree of opening of the dynamic braking valve the flow from the ground driven pump will be restricted to create pressure in the pump which increases the load on the engine.

Since the engine is connected to the drive wheels by the normal drive train the pressure against the load control valve 64 will provide resistance to or retarding of an increase in the speed of the machine. The pressure may be adjusted by the machine operator by varying the degree of opening of the dynamic braking valve thus controlling the amount of retarding to match the degree of slope of the downhill area of the terrain on which the machine is operating. This eliminates or reduces the degree of engagement of the oil-cooled brakes for retarding purposes thus reducing the amount of cooling oil which must be circulated through the brakes. As a result the size of the oil cooled brakes may be reduced with a consequent reduction in cost and space requirements. When the machine reaches the bottom of the hill the selector valve is returned to the center or neutral position 66 to divert the output of the ground driven pump 22 to the pump inlet line 50 for recirculation.

Should the engine die or a failure of the pump 16 occur the pressure in the primary pump output line decreases. When the pressure drops below a predetermined level the sensor 71 generates a signal which is sent to the control system 72. The control system, in turn, generates an actuating signal which is sent to the appropriate end of the selector valve 54. The selector valve 54, responsive to the actuating signal is moved to the second or steering position 68 to direct the output of the ground driven pump into the primary pump output line 38 of the steering circuit. The flow from the ground driven pump 22 is communicated to the line 38 at a point between the one-way check valve 40 and the steering valve 44. The one-way check valve 40 blocks flow to the inactive primary pump 16 so that the output of the ground driven pump 22 is directed to the steering valve 44 as a secondary supply for steering of the machine.

In view of the foregoing, it is readily apparent that the structure of the present invention is constructed to permit selective use of a ground driven pump to provide a secondary supply to a primary fluid system or fluid for a dynamic braking system to retard the speed of a machine when traveling down hill. The invention permits the elimination of or reduction in the size of other retarding devices such as commonly used oil cooled disc brakes.

Other aspects, objects and advantages of this invention can be obtained from a study of the drawings, the description and the appended claims.

I claim:

1. A hydraulic control system for a wheeled machine having an engine and a drive system for driving at least one wheel of the machine, the hydraulic system comprising:

a primary fluid work system including a primary pump driven by the engine and a motor communicating therewith, a control valve interposed the primary pump and the motor and a fluid reservoir from which the pump draws fluid, a secondary fluid supply means including a ground driven pump connected to the machine drive system in a manner to cause the ground driven pump to be driven by rotation of the at least one wheel due to its contact with the ground while the machine is moving, a dynamic braking system for retarding the speed of the machine during downhill operation, a selector valve disposed in controlling relation to an output of the ground driven pump and having a first position for controllably directing the output of the ground driven pump back to an inlet thereof, a second position for directing the output of the ground driven pump to the primary fluid work system and a third position for directing the output of the ground driven pump to the dynamic braking system, means in the dynamic braking system for controllably, variably restricting the flow of fluid from the ground driven pump to create sufficient pressure in the ground driven pump to retard movement of the machine.

2. The hydraulic control system of claim 1 wherein the means for variably restricting includes a dynamic braking valve having a flow path therethrough and a movable control element for varying the capacity of the flow path through the valve.

3. The hydraulic control system of claim 2 including an operator selector control for sending a signal to the selector valve to move the selector valve to the third position.

4. The hydraulic control system of claim 3 wherein the means for variably restricting includes an operator dynamic braking control means for selectively directing a signal to the valve for varying the position of the movable control element.

5. The hydraulic control system of claim 4 including a supplemental supply control means for sensing pressure in the primary fluid work system and responsive to a reduction of the pressure below a predetermined level to send a signal to the selector valve for moving the selector valve to the second position to supply fluid from the ground driven pump to the primary fluid work system.

6. The hydraulic control system of claim 5 wherein the primary fluid work system includes a one way check valve interposed the primary pump and the control valve to allow fluid flow therethrough only from the primary pump to the control valve and the output of the ground driven pump is communicated to the primary fluid work system at a point disposed between the one way check valve and the control valve.

7. The hydraulic control system of claim 6 including a return line communicating between the dynamic braking valve and the fluid reservoir to return fluid flowing through the dynamic braking valve to the reservoir, a fluid cooler disposed in the return line, a fan for inducing air flow through the fluid cooler, a fluid fan motor drivingly connected to the fan and communicating with the dynamic braking system in a manner such that flow from the ground driven pump in excess of that flowing through the dynamic braking valve is directed to the fluid fan motor and a thermostatically controlled fan regulating valve interposed the dynamic braking system and the fluid fan motor for controlling fluid flow through the fan motor.

* * * * *